(12) United States Patent
McInnis et al.

(10) Patent No.: US 9,916,775 B2
(45) Date of Patent: Mar. 13, 2018

(54) JOINT ASSEMBLY FOR CRASH TEST DUMMY

(71) Applicant: Humanetics Innovative Solutions, Inc., Plymouth, MI (US)

(72) Inventors: Joseph P. McInnis, Ann Arbor, MI (US); Zhenwen J. Wang, Farmington Hills, MI (US); Nicholas M. Kloppenborg, Columbus, OH (US); Joseph Q. Gibbs, Birmingham, MI (US); Leonard M. Benfant, Livonia, MI (US); Scott Lane, New Boston, MI (US)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 866 days.

(21) Appl. No.: 14/164,533

(22) Filed: Jan. 27, 2014

(65) Prior Publication Data

US 2014/0294485 A1 Oct. 2, 2014

Related U.S. Application Data

(60) Provisional application No. 61/805,594, filed on Mar. 27, 2013.

(51) Int. Cl.
*F16C 11/06* (2006.01)
*G09B 23/32* (2006.01)
*F16M 11/14* (2006.01)

(52) U.S. Cl.
CPC ............. *G09B 23/32* (2013.01); *F16M 11/14* (2013.01); *Y10T 403/32032* (2015.01)

(58) Field of Classification Search
CPC ............. G09B 23/32; Y10T 403/32032; Y10T 403/32631; Y10T 403/32704;
(Continued)

(56) References Cited

U.S. PATENT DOCUMENTS

| 526,667 | A | * | 9/1894 | Shultz | ...................... A63H 3/46 |
| | | | | | 223/66 |
| 1,123,839 | A | * | 1/1915 | Bridges | .................. F16K 15/026 |
| | | | | | 137/540 |

(Continued)

FOREIGN PATENT DOCUMENTS

| EP | 1 038 286 B1 | 4/2002 |
| EP | 2 305 078 A1 | 4/2011 |

(Continued)

*Primary Examiner* — Joshua J Michener
*Assistant Examiner* — Kyle J. Walraed-Sullivan
(74) *Attorney, Agent, or Firm* — Howard & Howard Attorneys PLLC

(57) ABSTRACT

A joint assembly for a crash test dummy includes a first joint member for connection to a first member of the crash test dummy. The joint assembly also includes a first ball member received by the first joint member. The joint assembly includes a second ball member spaced from the first ball member. The joint assembly also includes a second joint member for connection to a second member of the crash test dummy. The second joint member receives the second ball member and is operatively connected to the first joint member. The joint assembly further includes an adjustable member operatively cooperating with the first ball member and the second ball member to move the first ball member and the second ball member toward and away from each other to adjust a friction tightness of the joint assembly.

23 Claims, 5 Drawing Sheets

(58) Field of Classification Search
CPC ..... Y10T 403/32754; Y10T 403/32819; Y10T 403/32844; F16C 11/06; F16C 11/0604; F16C 11/0609; F16C 11/0695; F16C 11/10; F16C 11/103; F16C 11/106; A63H 3/46
USPC ............ 403/56, 97; 73/865.3, 865.1, 865.6; 434/262–275; 446/376, 383
See application file for complete search history.

(56) References Cited

U.S. PATENT DOCUMENTS

| | | | |
|---|---|---|---|
| 1,385,817 A | | 7/1921 | Dilworth |
| 1,796,901 A | * | 3/1931 | Spillman .................. F16B 7/04 403/56 |
| 1,968,492 A | * | 7/1934 | Kallus ...................... A63H 3/46 446/380 |
| 2,255,262 A | * | 9/1941 | MacFadden ............ F21V 21/30 285/185 |
| 2,349,411 A | | 5/1944 | Dorrance |
| 2,373,963 A | * | 4/1945 | Kallus ...................... A63H 3/46 446/380 |
| 2,394,276 A | * | 2/1946 | Venditty ................ B60G 7/005 403/127 |
| 2,434,986 A | * | 1/1948 | Bremer .................... B62B 7/08 248/124.1 |
| 2,449,728 A | | 9/1948 | Snethun |
| 2,494,734 A | | 1/1950 | Wilkinson |
| 2,883,221 A | * | 4/1959 | Latzen ................. F16C 11/0604 403/126 |
| 3,030,133 A | * | 4/1962 | Rowlett ............. F16C 11/0614 280/93.511 |
| 3,238,809 A | * | 3/1966 | Beard ................... A01B 59/004 464/147 |
| 3,278,207 A | * | 10/1966 | Barish .................... A61G 13/10 285/312 |
| 3,491,378 A | | 1/1970 | Ioffe et al. |
| 3,754,338 A | * | 8/1973 | Culver ................... G09B 23/32 434/274 |
| 3,778,610 A | * | 12/1973 | Wolf ....................... F21V 21/26 174/86 |
| 3,916,451 A | * | 11/1975 | Buechel ................. A61F 2/3854 403/56 |
| 4,235,025 A | | 11/1980 | Kortge |
| 4,261,113 A | | 4/1981 | Alderson |
| 4,276,032 A | * | 6/1981 | Woley .................... G09B 23/32 434/274 |
| 4,349,339 A | * | 9/1982 | Daniel ................... G09B 23/32 434/274 |
| 4,382,572 A | * | 5/1983 | Thompson ............... B60R 1/04 248/224.51 |
| 4,488,433 A | | 12/1984 | Denton et al. |
| 4,521,924 A | | 6/1985 | Jacobsen et al. |
| 4,548,446 A | * | 10/1985 | Warshawsky ........... F21V 21/26 285/185 |
| 4,673,374 A | * | 6/1987 | Kelley .................... A63H 3/46 446/383 |
| 4,685,928 A | | 8/1987 | Yaeger |
| 4,700,017 A | * | 10/1987 | Morand .................. H02G 3/06 174/86 |
| 4,850,877 A | | 7/1989 | Mason et al. |
| 4,958,643 A | | 9/1990 | Pansiera |
| 4,986,833 A | | 1/1991 | Worland |
| 5,180,086 A | | 1/1993 | Ikeda |
| 5,275,444 A | * | 1/1994 | Wythoff .............. F16L 27/0849 285/185 |
| 5,383,738 A | * | 1/1995 | Herbermann .............. B25J 9/06 248/288.51 |
| 5,435,652 A | * | 7/1995 | Howard ................... B62D 7/16 384/209 |
| 5,741,989 A | | 4/1998 | Viano et al. |
| 6,017,010 A | * | 1/2000 | Cui ....................... F16C 11/106 248/181.1 |
| 6,033,284 A | * | 3/2000 | Rodriguez Ferre ...... A63H 3/46 446/378 |
| 6,267,640 B1 | * | 7/2001 | Akashi ................... G09B 23/32 446/376 |
| 6,409,516 B1 | | 6/2002 | Thill |
| 6,695,619 B2 | | 2/2004 | Brown-Wilkinson |
| 6,957,961 B1 | | 10/2005 | Owens et al. |
| 6,982,409 B2 | | 1/2006 | Huang et al. |
| 7,044,926 B2 | | 5/2006 | Carlson |
| 7,086,273 B2 | | 8/2006 | Lipmyer |
| 7,153,328 B2 | | 12/2006 | Kim |
| 7,178,421 B2 | * | 2/2007 | Filipiak .................... F16C 11/06 248/278.1 |
| 7,568,672 B2 | * | 8/2009 | Ferrer .................... F16M 11/14 248/229.1 |
| 7,690,822 B2 | * | 4/2010 | Kauffman ............... F21V 21/26 362/275 |
| 7,753,866 B2 | | 7/2010 | Jackovitch |
| 7,891,259 B2 | | 2/2011 | Kim et al. |
| RE42,418 E | | 6/2011 | Lipmyer |
| 8,444,698 B2 | | 5/2013 | Klotz et al. |
| 8,562,686 B2 | | 10/2013 | Klotz et al. |
| 2003/0077110 A1 | * | 4/2003 | Knowles ................ F16L 27/04 403/56 |
| 2005/0066705 A1 | | 5/2005 | Choi |
| 2005/0276656 A1 | * | 12/2005 | Lim ......................... F16C 7/02 403/56 |
| 2006/0051728 A1 | * | 3/2006 | Browne-Wilkinson . G09B 23/34 434/267 |
| 2007/0151387 A1 | * | 7/2007 | Vogt ...................... F16C 11/106 74/473.34 |
| 2008/0021570 A1 | | 1/2008 | Bedard et al. |
| 2008/0286736 A1 | * | 11/2008 | Browne-Wilkinson . G09B 23/32 434/274 |
| 2009/0136290 A1 | * | 5/2009 | Persson ............... B60R 11/0252 403/125 |
| 2009/0245928 A1 | * | 10/2009 | Brunneke ........... F16C 11/0604 403/127 |
| 2014/0190280 A1 | * | 7/2014 | Been ...................... G09B 23/32 73/866.4 |
| 2014/0294486 A1 | * | 10/2014 | Staade ................. F16C 11/0671 403/113 |
| 2015/0086957 A1 | * | 3/2015 | Gibbs ..................... G09B 23/32 434/267 |

FOREIGN PATENT DOCUMENTS

| | | |
|---|---|---|
| WO | 98/47122 A1 | 10/1998 |
| WO | 2009/101200 A1 | 8/2008 |

* cited by examiner

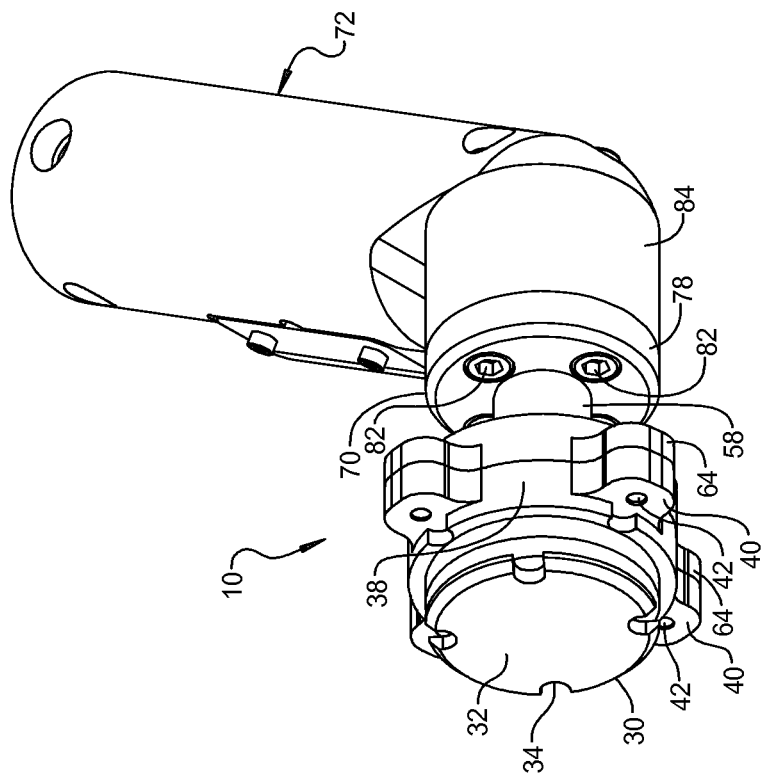
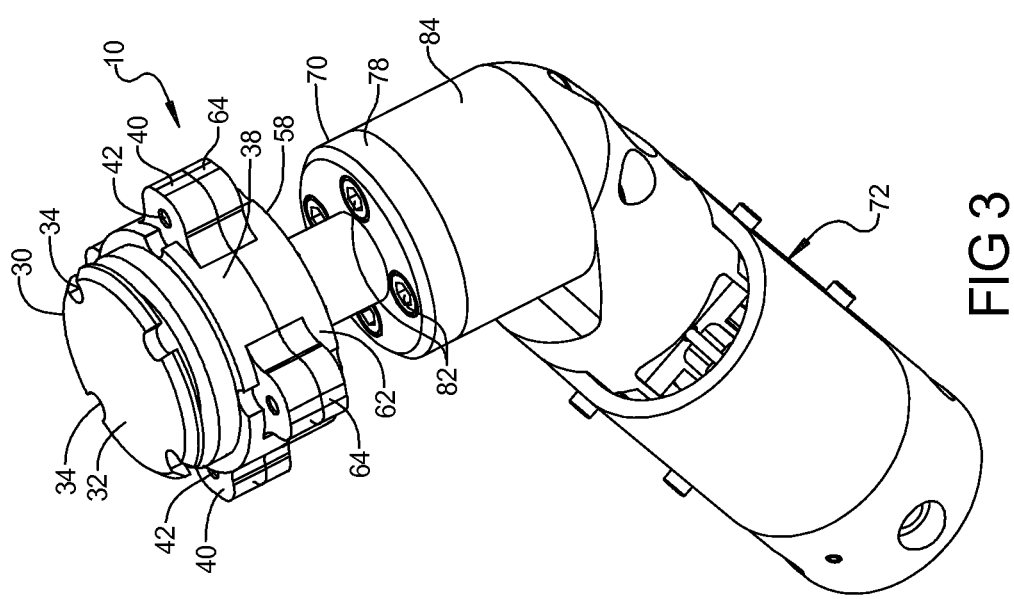

JOINT ASSEMBLY FOR CRASH TEST DUMMY

CROSS-REFERENCE TO RELATED APPLICATION(S)

The present invention claims the priority date of U.S. Provisional Patent Application Ser. No. 61/805,594, filed Mar. 27, 2013.

GOVERNMENT RIGHTS

The invention was made with government support under Government contract number W911QX-12-C-0015 awarded by the Department of the Army. The government has certain rights in the invention.

BACKGROUND OF THE INVENTION

1. Field of the Invention

The present invention relates generally to crash test dummies and, more particularly, to a joint assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic mannequins, better known as "crash test dummies", to estimate a human's injury risk. The dummy must possess the general mechanical properties, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly, rib cage assembly, pelvis assembly, right and left arm assemblies, and right and left leg assemblies. The pelvis assembly and leg assembly are connected together through a joint.

One disadvantage of a current joint is that it does not allow for easy access to adjust a tightness of the joint without disassembling the dummy. Another disadvantage of the current joint is that it has a very small contact area to generate friction and lacks friction adjustment for tightness of the joint. Yet another disadvantage of the current joint is that it only applies to a particular type of joint such as a hip joint of a crash test dummy. Thus, there is a need in the art for a joint assembly that has easy access for tightening, has sufficient joint friction, and can be applied to other joints beside the hip of the crash test dummy.

SUMMARY OF THE INVENTION

Accordingly, the present invention is a joint assembly for a crash test dummy. The joint assembly includes a first joint member for connection to a first member of the crash test dummy. The joint assembly includes a first ball member received by the first joint member. The joint assembly includes a second ball member spaced from the first ball member. The joint assembly also includes a second joint member for connection to a second member of the crash test dummy. The second joint member receives the second ball member and is operatively connected to the first joint member. The joint assembly further includes an adjustable member operatively cooperating with the first ball member and the second ball member to move the first ball member and the second ball member toward and away from each other to adjust a friction tightness of the joint assembly.

In addition, the present invention is a crash test dummy including a body and at least one assembly operatively attached to the body. The crash test dummy also includes a joint assembly operatively attached to the body and the at least one assembly. The joint assembly includes a first joint member connected to the body. The joint assembly includes a first ball member received by the first joint member. The joint assembly includes a second ball member spaced from the first ball member. The joint assembly also includes a second joint member connected to the at least one assembly. The second joint member receives the second ball member and is operatively connected to the first joint member. The joint assembly further includes an adjustable member operatively cooperating with the first ball member and the second ball member to move the first ball member and the second ball member toward and away from each other to adjust a friction tightness of the joint assembly.

One advantage of the present invention is that a new joint assembly is provided for a crash test dummy. Another advantage of the present invention is that the joint assembly includes a spherical joint for the crash test dummy, introduction of adjustable joint friction to obtain more tightness, and geometric simplification of components for ease of access and manufacturing. Yet another advantage of the present invention is that the joint assembly has a large contact area between a ball and socket, providing a large engagement area for a positive friction adjustment. Still another advantage of the present invention is that the joint assembly is a mechanical adjustment for adjusting a tightness of the joint on a crash test dummy. A further advantage of the present invention is that the joint assembly provides friction adjustment for tightness of the joint on a crash test dummy. Yet a further advantage of the present invention is that the joint assembly allows access from outside the crash test dummy for tightness adjustment of the joint. Still a further advantage of the present invention is that the joint assembly can be used not only for the hip joint, but can be used for other joints of the crash test dummy. Yet still a further advantage of the present invention is that the joint assembly can be used on the left hand and right hand positions of the crash test dummy.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a perspective view of the joint assembly of FIG. 2.

FIG. 4 is another perspective view of the joint assembly of FIG. 2.

DESCRIPTION OF THE PREFERRED EMBODIMENT(S)

Figure 1:
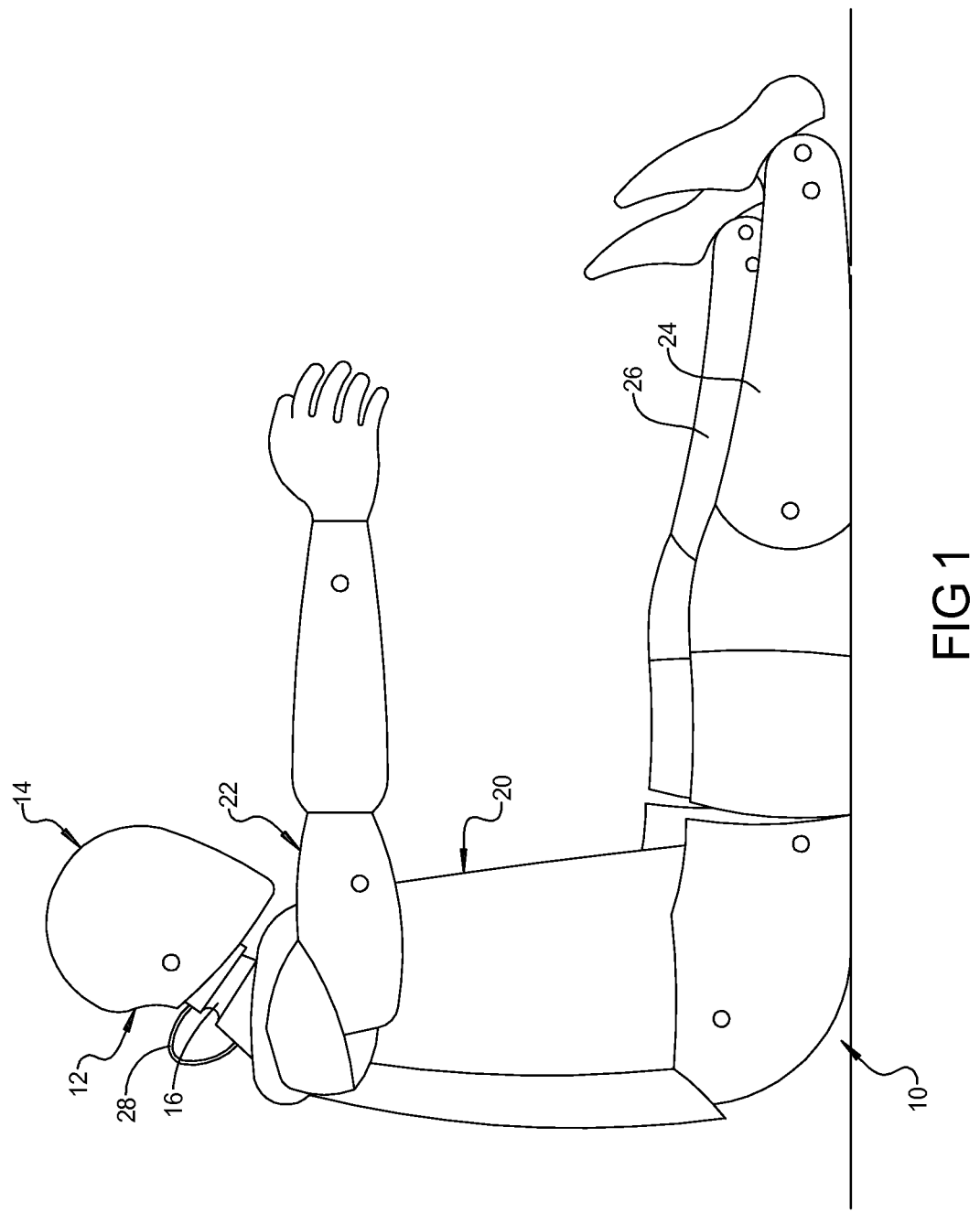
FIG. 1 is a side view of one embodiment of a joint assembly, according to the present invention, illustrated in operational relationship with a crash test dummy.
Figure 2:
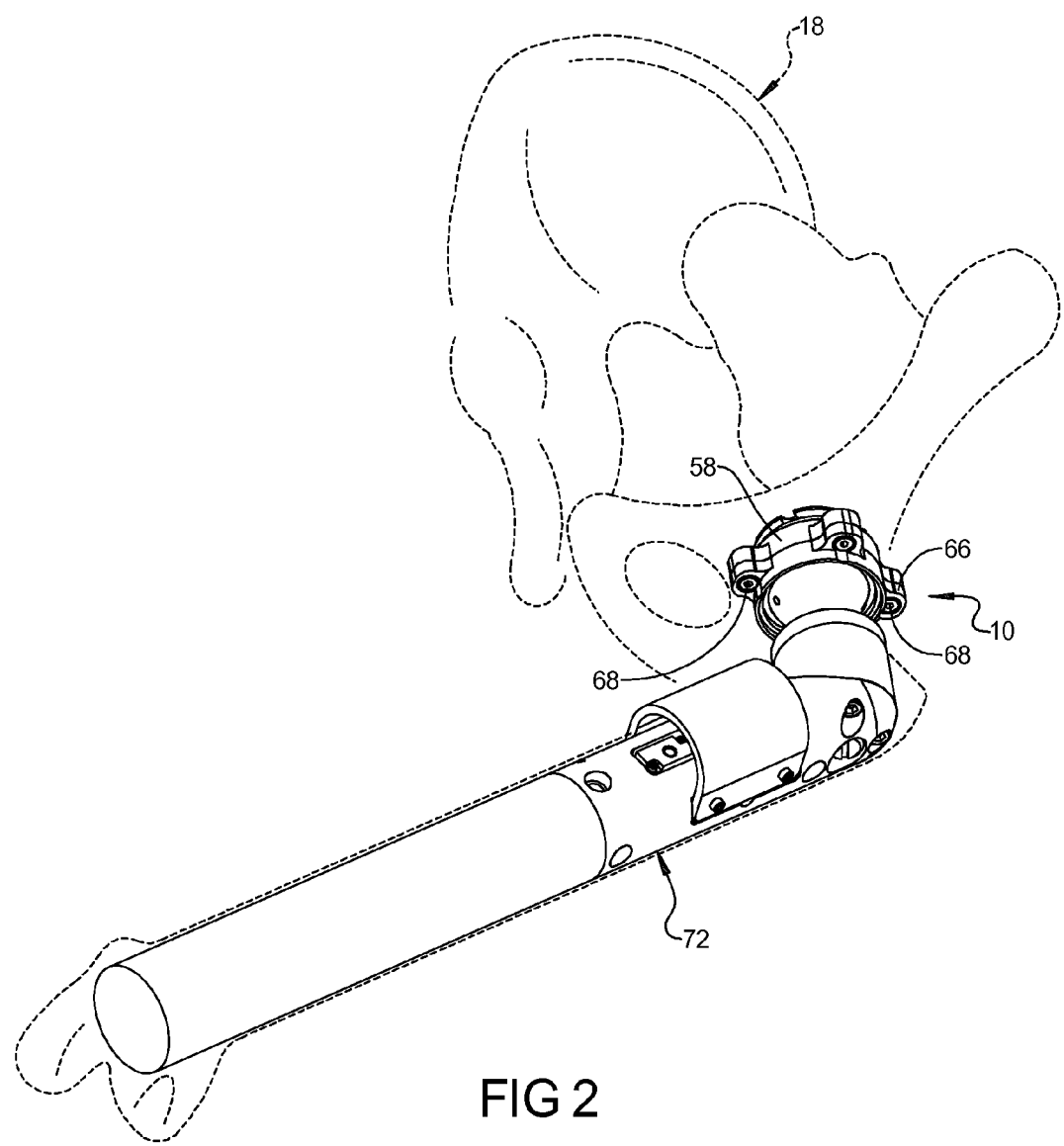
FIG. 2 is a perspective view of the joint assembly illustrated in operational relationship with a portion of the crash test dummy of FIG. 1.
Figure 5:
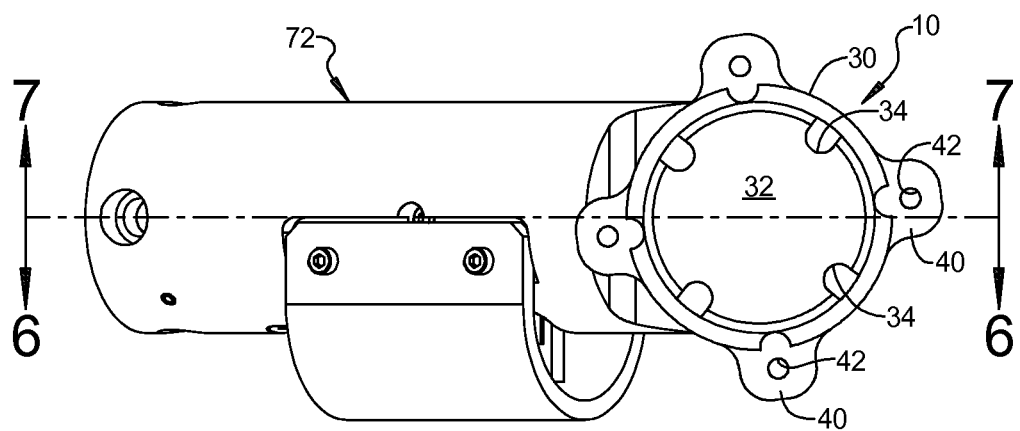
FIG. 5 is a front elevational view of the joint assembly of FIG. 2.
Figure 6:
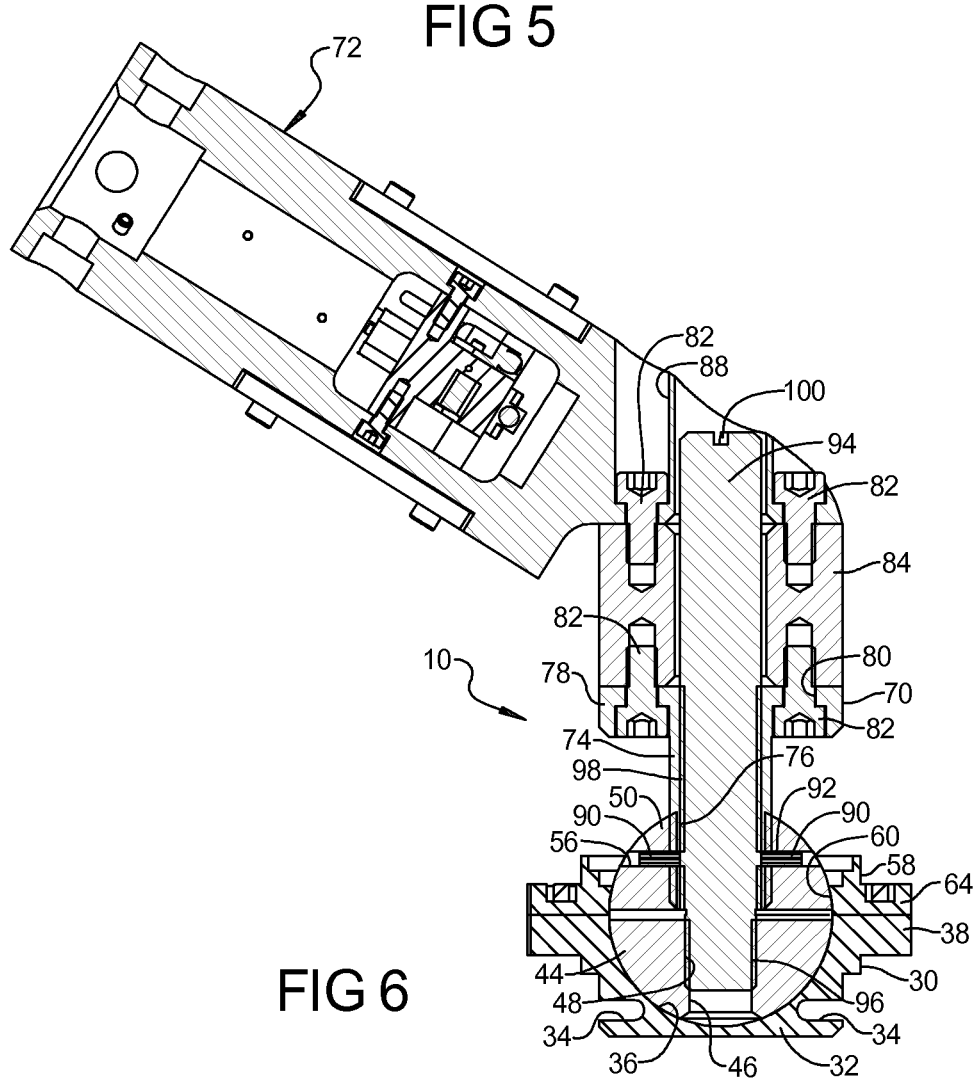
FIG. 6 is a sectional view taken along line 6-6 of FIG. 5.
Figure 7:
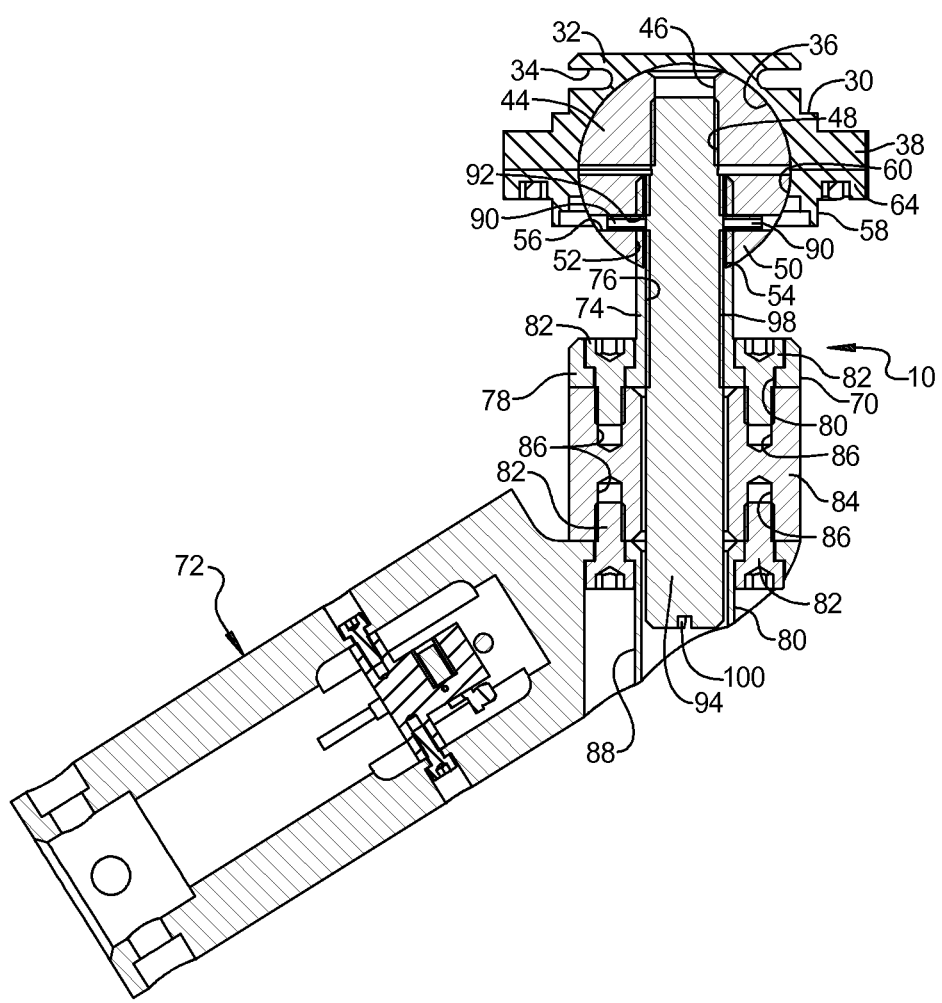
FIG. 7 is a sectional view taken along line 7-7 of FIG. 5.

Referring to the drawings and in particular FIGS. 1 and 2, one embodiment of a joint assembly 10, according to the present invention, is shown in operational relationship with a crash test dummy, generally indicated at 12. The crash test dummy 12 is of a fiftieth percentile (50%) male type and is illustrated in a sitting position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 includes a head assembly, generally indicated at 14. The crash test dummy 12 also includes a spine assembly, generally indicated at 16, having an upper end mounted to the head assembly 12 and a lower end extending into a torso area of the crash test dummy 12. The crash test dummy 12 further includes a pelvis assembly 18 (FIG. 2) connected to a spine mounting bracket (not shown) of the spine assembly 16.

The torso area of the crash test dummy 12 also includes a rib cage assembly, generally indicated at 20, connected to the spine assembly 16. The crash test dummy 12 also has a pair of arm assemblies including a right arm assembly, generally indicated at 22, and a left arm assembly (not shown), which are attached to the crash test dummy 12. The crash test dummy 12 further includes a right leg assembly 24 and a left leg assembly 26, which are attached to the pelvis assembly 18. It should be appreciated that various components of the crash test dummy 12 are covered in a urethane skin such as a flesh and skin assembly (partially shown) for improved coupling with the skeleton of the crash test dummy 12. It should also be appreciated that a lifting ring 28 may be attached to the spine assembly 16 for lifting the crash test dummy 12 into and out of test fixtures and vehicles.

Referring to FIGS. 2 through 7, the joint assembly 10, according to the present invention, is shown. In one embodiment, the joint assembly 10 is used for the hip joint to connect one of the leg assemblies 24, 26 to the pelvis assembly 18. The joint assembly 10 can be used on both the right hand and left hand positions of the crash test dummy 12. In the embodiment illustrated in FIG. 2, one joint assembly 10 is on the left hand position of the crash test dummy 12. Since the joint assembly 10 is interchangeable for each of the right hand and left hand positions of the crash test dummy 12, only one the joint assembly 10 will be subsequently described. It should be appreciated that the subsequent description of the joint assembly 10 is that same for both the right hand and left hand positions of the crash test dummy 12. It should also be appreciated that the joint assembly 10 may be used for other joints of the crash test dummy 12.

Referring to FIGS. 2 through 7, the joint assembly 10 includes a first joint member 30 for connection to the pelvis assembly 18. The first joint member 30 has a base portion 32 that is generally circular in shape. The base portion 32 has at least one or more recesses 34 circumferentially spaced and extending radially therein. The first joint member 30 also has a cavity portion 36 extending into the base portion 32. The cavity portion 36 has a generally hemi-spherical shape. The first joint member 30 also has a ring portion 38 extending circumferentially about the cavity portion 36 and radially outward from the base portion 32. The ring portion 38 is generally circular in shape and includes at least one or more flanges 40 extending radially outwardly. The flanges 40 have an aperture 42 extending axially therethrough. The first joint member 30 is connected to the pelvis assembly 18 by a suitable mechanism such as molding a pelvis member of the pelvis assembly 18 around the base portion 32. It should be appreciated that the first joint member 30 is disposed in a socket of the pelvis assembly 18.

The joint assembly 10 includes a first ball member 44 disposed and received in the cavity portion 36 of the first joint member 30. The first ball member 44 is generally hemispherically shaped. The first ball member 44 includes a cavity portion 46 extending axially therein. The cavity portion 46 has a generally circular cross-sectional shape. The cavity portion 46 also has a plurality of internal threads 48 along an axial portion thereof. The internal threads 48 have a left-handed thread. The cavity portion 46 has a predetermined diameter such as 14.5 millimeters. It should be appreciated that the first ball member 44 is movable relative to the first joint member 30.

The joint assembly 10 includes a second ball member 50 spaced from and cooperating with the first ball member 44. The second ball member 50 is generally hemispherically shaped. The second ball member 50 includes a cavity portion 52 extending axially therein. The cavity portion 52 has a generally circular cross-sectional shape. The cavity portion 54 has a predetermined diameter such as 16.5 millimeters. The second ball member 50 also has one or more apertures 56 extending radially therethrough. It should be appreciated that the second ball member 50 and first ball member 44 form a spherical ball joint.

The joint assembly 10 also includes a retainer 58 for retaining the second ball member 50 relative to the first ball member 44. The retainer 58 has a cavity portion 60 therein. The cavity portion 60 has a generally hemi-spherical shape. The retainer 58 also has a ring portion 62 extending circumferentially about the cavity portion 60 and radially outward. The ring portion 62 is generally circular in shape and includes at least one or more flanges 64 extending radially outwardly. The flanges 64 have an aperture 66 extending axially therethrough. The retainer 58 is connected to the first joint member 30 by a suitable mechanism such as fasteners 68 extending through the apertures 66 in the retainer 58 and into the apertures 42 in the first joint member 30. It should be appreciated that the second ball member 44 is movable relative to the retainer 58.

The joint assembly 10 includes a second joint member 70 for operative connection to an assembly of the crash test dummy 12. In the embodiment illustrated, the joint assembly 10 is operatively connected to a femur assembly, generally indicated at 72, of the leg assembly 24, 26. The second joint member 70 has a sleeve portion 74 extending axially and having one end extending into the cavity 52 of the second ball member 50. The sleeve portion 74 has a plurality of internal threads 76 extending axially along an internal passage thereof. The second joint member 70 has a base portion 78 extending radially outwardly from one end of the sleeve portion 74. The base portion 78 is generally circular in shape and has at least one or more apertures 80 extending axially therethrough. In one embodiment, the second joint member 70 may be connected directly to the femur assembly 72 by a suitable mechanism such as fasteners 82 extending through the apertures 80 in the base portion 78 and threadably engaging the femur assembly 72. In another embodiment, the second joint member 70 may be connected indirectly to the femur assembly 72 via a load cell 84. As illustrated in the figures, the load cell 84 has one or more apertures 86 extending into each axial end. The fasteners 82 extending through the apertures 80 in the base portion 78 and threadably engaging the apertures 86 in one end of the load cell 84. Fasteners 82 also extend through apertures 88 in the femur assembly 72 and threadably engage the apertures 86 in the other end of the load cell 84. It should be appreciated that the load cell 84 is optional and commercially available. It should also be appreciated that the load cell 84 measures a load of the joint assembly 10 through the femur assembly 72.

The joint assembly 10 further includes one or more guide pins 90 extending between the second joint member 70 and the second ball member 50 to connect the second joint member 70 to the second ball member 50 and to prevent rotation therebetween. The guide pins 90 are generally cylindrical in shape and are disposed in the apertures 56 of the second ball member 50 and engage corresponding apertures 92 in the sleeve portion 74 of the second joint member 70. It should be appreciated that the second ball member 50 and second joint member 70 move as a unit.

The joint assembly 10 also includes an adjustable member 94 for operatively cooperating with the first ball member 44 and the second ball member 50 to move the first ball member 44 and the second ball member 50 toward and away from each other to adjust a friction tightness of the joint. The adjustable member 94 is generally cylindrical in shape and extends axially. The adjustable member 94 has a first plurality of external threads 96 at one axial end thereof for threadably engaging the internal threads 48 in the cavity 46 of the first ball member 44. The external threads 96 are left-handed threads. The adjustable member 94 also has a second plurality of external threads 98 spaced from the first plurality of external threads 96 and disposed along an axial extent thereof for threadably engaging the internal threads 76 of the sleeve portion 74 of the second joint member 70. The external threads 98 are right-handed threads. The adjustable member 94 has a recess 100 extending axially into one end thereof for engagement with a tool (not shown) to rotate the adjustable member 94. It should be appreciated that the adjustable member 94 extends through an access aperture in the femur assembly 72 to allow the tool to be inserted into the recess 100. It should also be appreciated that the rotation of the adjustable member 94 adjusts the axial distance or space between the second ball member 50 and the first ball member 44. It should further be appreciated that the threads 96 may be left-handed and the threads 98 may be right-handed to correspond with left-handed threads 48 and right-handed threads 76.

In operation, an operator inserts the tool (not shown) through the access aperture of the femur assembly 72 and into the recess 100 of the adjustable member 94 to rotate the adjustable member 94. As the adjustable member 94 rotates, the external threads 98 threadably engage the internal threads 76 of the sleeve portion 74 of the second joint member 70. Since the second joint member 70 is pinned to the second ball member 50 via the guide pins 90, the second ball member 50 moves toward or away the first ball member 44. Since the retainer 58 is fastened to the first joint member 30, the external threads 96 threadably engage the internal threads 48 of the first ball member 44. Since the internal threads 48 and external threads 96 are left-handed and the external threads 98 and internal threads 76 are right-handed, the first ball member 44 and second ball member 50 moves toward or away each other depending on the rotation of the adjustment member 94 to adjust the tightness or friction of the joint assembly 10.

Accordingly, the joint assembly 10 of the present invention provides a spherical joint for the hip joint, introduction of adjustable joint friction to obtain more tightness, and geometric simplification of components for ease of access and manufacturing. The joint assembly 10 of the present invention provides a mechanical adjustment for tightness adjustment of the joint on the crash test dummy 12. The joint assembly 10 of the present invention provides friction adjustment for tightness of the joint on the crash test dummy 12. The joint assembly 10 of the present invention allows access from outside the crash test dummy 12 for tightness adjustment of the joint. The joint assembly 10 of the present invention can be used not only for the hip joint, but can be used for other joints of the crash test dummy 12, and can be used on the left hand and right hand positions of the crash test dummy 12.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A joint assembly for a crash test dummy comprising:
   a first joint member for connection to a first member of the crash test dummy;
   a first ball member received by said first joint member;
   a second ball member spaced from said first ball member;
   a second joint member for connection to a second member of the crash test dummy, said second joint member receiving said second ball member and being operatively connected to said first joint member;
   an adjustable member having a plurality of first threads operatively cooperating with said first ball member and a plurality of second threads being threaded in an opposite direction from said plurality of first threads and operatively cooperating with said second ball member to move said first ball member and said second ball member toward and away from each other to adjust a friction tightness of said joint assembly; and
   at least one guide pin extending between said second joint member and said second ball member to connect said second joint member to said second ball member and to prevent rotation therebetween.

2. A joint assembly as set forth in claim 1 wherein said adjustable member is generally cylindrical in shape and extends axially.

3. A joint assembly as set forth in claim 1 wherein said first joint member has a base portion with at least one recess extending radially therein.

4. A joint assembly as set forth in claim 1 wherein said first ball member includes a cavity portion extending therein.

5. A joint assembly as set forth in claim 4 wherein said cavity portion includes a plurality of internal threads along an axial portion thereof.

6. A joint assembly as set forth in claim 1 wherein said second ball member includes a cavity portion extending axially therein.

7. A joint assembly as set forth in claim 1 including a retainer for retaining said second ball member relative to said first ball member.

8. A joint assembly as set forth in claim 7 wherein said retainer has a cavity portion therein.

9. A joint assembly as set forth in claim 7 wherein said retainer includes a ring portion extending circumferentially about said cavity portion and radially outward.

10. A joint assembly for a crash test dummy comprising:
a first joint member for connection to a first member of the crash test dummy;
a first ball member received by said first joint member;
a second ball member spaced from said first ball member;
a second joint member for connection to a second member of the crash test dummy, said second joint member receiving said second ball member and being operatively connected to said first joint member, said second joint member having an access aperture extending therein;
an adjustable member having a plurality of first threads and a plurality of second threads being threaded in opposite directions and operatively cooperating with said first ball member and said second ball member to move said first ball member and said second ball member toward and away from each other to adjust a friction tightness of said joint assembly;
wherein said second ball member includes a cavity portion extending axially therein;
wherein said second joint member has a sleeve portion extending axially and having one end extending into said cavity of said second ball member; and
wherein said adjustable member extends through said access aperture in said second joint member to allow a tool to be inserted to rotate said adjustable member.

11. A joint assembly as set forth in claim 10 wherein said sleeve portion has a plurality of internal threads extending axially along an internal passage thereof.

12. A joint assembly as set forth in claim 5 wherein said adjustable member includes a first plurality of external threads at one axial end thereof for threadably engaging said internal threads in said cavity of said first ball member.

13. A joint assembly for a crash test dummy comprising:
a first joint member for connection to a first member of the crash test dummy;
a first ball member received by said first joint member;
a second ball member spaced from said first ball member;
a second joint member for connection to a second member of the crash test dummy, said second joint member receiving said second ball member and being operatively connected to said first joint member;
an adjustable member operatively cooperating with said first ball member and said second ball member to move said first ball member and said second ball member toward and away from each other to adjust a friction tightness of said joint assembly;
wherein said adjustable member includes a first plurality of external threads at one axial end thereof for threadably engaging internal threads in a cavity of said first ball member;
wherein said adjustable member includes a second plurality of external threads spaced from said first plurality of external threads and being threaded in an opposite direction from said plurality of first threads and being disposed along an axial extent thereof for threadably engaging internal threads of said sleeve portion of said second joint member; and
at least one guide pin extending between said second joint member and said second ball member to connect said second joint member to said second ball member and to prevent rotation therebetween.

14. A joint assembly as set forth in claim 13 wherein said at least one guide pin is generally cylindrical in shape and is disposed in apertures of said second ball member and said sleeve portion of said second joint member.

15. A hip joint assembly for a crash test dummy comprising:
a first joint member for connection to a pelvis of the crash test dummy;
a first ball member received by said first joint member;
a second ball member spaced from said first ball member;
a second joint member for connection to a leg of the crash test dummy, said second joint member receiving said second ball member and being operatively connected to said first joint member, said second joint member having an access aperture extending therein; and
an adjustable member having a plurality of first threads operatively cooperating with said first ball member and a plurality of second threads being threaded in an opposite direction from said plurality of first threads and operatively cooperating with said second ball member to move said first ball member and said second ball member toward and away from each other to adjust a friction tightness of said joint assembly, and wherein said adjustable member extends through said access aperture in said second joint member to allow a tool to be inserted to rotate said adjustable member.

16. A joint assembly for a crash test dummy comprising:
a first joint member for connection to a first member of the crash test dummy, said first joint member having a cavity portion;
a first ball member disposed in said cavity portion and having a cavity extending axially therein with a plurality of threads;
a second ball member spaced from said first ball member;
a second joint member for operative connection to a second member of the crash test dummy, said second joint member receiving said second ball member and being operatively connected to said first joint member, said second joint member having a sleeve portion extending axially and having a plurality of threads, said second joint member having an access aperture extending therein; and
an adjustable member having a plurality of first threads cooperating with said threads of said first ball member and a plurality of second threads being threaded in an opposite direction from said plurality of first threads and cooperating with said threads of said sleeve portion to move said first ball member and said second ball member toward and away from each other to adjust a friction tightness of said joint assembly, and wherein said adjustable member extends through said access aperture in said second joint member to allow a tool to be inserted to rotate said adjustable member.

17. A crash test dummy comprising:
a body;
at least one assembly operatively attached to said body; and
a joint assembly operatively attached to said body and said at least one assembly and comprising a first joint member connected to said body;
a first ball member received by said first joint member;
a second ball member spaced from said first ball member;

a second joint member connected to said at least one assembly, said second joint member receiving said second ball member and being operatively connected to said first joint member, said second joint member having an access aperture extending therein;

an adjustable member having a plurality of first threads operatively cooperating with said first ball member and a plurality of second threads being threaded in an opposite direction from said plurality of first threads and operatively cooperating with said second ball member to move said first ball member and said second ball member toward and away from each other to adjust a friction tightness of said joint assembly; and wherein said adjustable member extends through said access aperture in said second joint member to allow a tool to be inserted to rotate said adjustable member.

18. A crash test dummy as set forth in claim 17 wherein said adjustable member is generally cylindrical in shape and extends axially.

19. A crash test dummy as set forth in claim 17 wherein said plurality of first threads are disposed at one axial end of said adjustable member for threadably engaging said first ball member.

20. A crash test dummy comprising:
a body;
at least one assembly operatively attached to said body;
a joint assembly operatively attached to said body and said at least one assembly and comprising a first joint member connected to said body;
a first ball member received by said first joint member;
a second ball member spaced from said first ball member;
a second joint member connected to said at least one assembly, said second joint member receiving said second ball member and being operatively connected to said first joint member, said second joint member having an access aperture extending therein;
an adjustable member operatively cooperating with said first ball member and said second ball member to move said first ball member and said second ball member toward and away from each other to adjust a friction tightness of said joint assembly;
wherein said adjustable member includes a first plurality of external threads at one axial end thereof for threadably engaging said first ball member;
wherein said adjustable member includes a second plurality of external threads spaced from said first plurality of external threads and being threaded in an opposite direction from said plurality of first threads and being disposed along an axial extent thereof for threadably engaging said second joint member; and
wherein said adjustable member extends through said access aperture in said second joint member to allow a tool to be inserted to rotate said adjustable member.

21. A crash test dummy comprising:
a body;
at least one assembly operatively attached to said body;
a joint assembly operatively attached to said body and said at least one assembly and comprising a first joint member connected to said body;
a first ball member received by said first joint member;
a second ball member spaced from said first ball member;
a second joint member connected to said at least one assembly, said second joint member receiving said second ball member and being operatively connected to said first joint member;

an adjustable member having a plurality of first threads operatively cooperating with said first ball member and a plurality of second threads operatively cooperating with said second ball member to move said first ball member and said second ball member toward and away from each other to adjust a friction tightness of said joint assembly; and at least one guide pin extending between said second joint member and said second ball member to connect said second joint member to said second ball member and to prevent rotation therebetween.

22. A crash test dummy comprising:
a body having a pelvis portion and a leg portion;
a hip joint assembly operatively attached to said pelvis portion and said leg portion and comprising a first joint member connected to said pelvis portion;
a first ball member received by said first joint member; a second ball member spaced from said first ball member;
a second joint member connected to said leg portion, said second joint member receiving said second ball member and being operatively connected to said first joint member, said second joint member having an access aperture extending therein;
an adjustable member having a plurality of first threads operatively cooperating with said first ball member and a plurality of second threads being threaded in an opposite direction from said plurality of first threads and operatively cooperating with said second ball member to move said first ball member and said second ball member toward and away from each other to adjust a friction tightness of said joint assembly; and
wherein said adjustable member extends through said access aperture in said second joint member to allow a tool to be inserted to rotate said adjustable member.

23. A crash test dummy comprising:
a body;
at least one assembly operatively attached to said body; and
a joint assembly operatively attached to said body and said at least one assembly and comprising a first joint member connected to said body, said first joint member having a cavity portion;
a first ball member disposed in said cavity portion and having a cavity extending axially therein with a plurality of threads;
a second ball member spaced from said first ball member;
a second joint member connected to said at least one assembly, said second joint member receiving said second ball member and being operatively connected to said first joint member, said second joint member having a sleeve portion extending axially and having a plurality of threads;
an adjustable member having a plurality of first threads cooperating with said threads of said first ball member and a plurality of second threads being threaded in an opposite direction from said plurality of first threads and cooperating with said threads of said sleeve portion to move said first ball member and said second ball member toward and away from each other to adjust a friction tightness of said joint assembly; and
at least one guide pin extending between said second joint member and said second ball member to connect said second joint member to said second ball member and to prevent rotation therebetween.

* * * * *